United States Patent [19]

Hunter et al.

[11] Patent Number: 5,375,206
[45] Date of Patent: Dec. 20, 1994

[54] METHOD FOR LICENSING SOFTWARE

[75] Inventors: James D. Hunter; William H. Watkins, both of Ft. Collins, Colo.

[73] Assignee: Hewlett-Packard Company, Palo Alto, Calif.

[21] Appl. No.: 198,657

[22] Filed: Feb. 18, 1994

Related U.S. Application Data

[63] Continuation of Ser. No. 31,063, Mar. 12, 1993, abandoned, which is a continuation of Ser. No. 667,725, Mar. 11, 1991, abandoned.

[51] Int. Cl.$^5$ ............... G06F 3/00; G06F 15/16
[52] U.S. Cl. ................. 395/200; 395/700; 395/600; 364/228.3; 364/260.4; 364/DIG. 1; 364/286
[58] Field of Search ............... 364/DIG. 1, DIG. 2

[56] References Cited

U.S. PATENT DOCUMENTS

| | | | |
|---|---|---|---|
| 4,441,163 | 4/1984 | Leikam et al. | 395/275 |
| 4,712,189 | 12/1987 | Mohri | 395/700 |
| 4,780,821 | 10/1988 | Crossley | 364/200 |
| 4,924,378 | 5/1990 | Hershey et al. | 364/200 |
| 4,937,863 | 6/1990 | Robert et al. | 380/4 |
| 4,941,175 | 7/1990 | Enescu et al. | 380/4 |
| 5,023,907 | 6/1991 | Johnson et al. | 380/4 |
| 5,138,712 | 8/1992 | Corbin | 395/700 |
| 5,146,593 | 9/1992 | Brandle et al. | 395/700 |
| 5,175,810 | 12/1992 | Young et al. | 364/DIG. 2 |

*Primary Examiner*—Gareth D. Shaw
*Assistant Examiner*—Lucien Toplu

[57] ABSTRACT

Disclosed is a system that provides a common application software interface for a variety of vendor supplied license servers. The system provides a single set of program calls and translates this single set of calls into a set of calls for each license server. This translation is performed using a translate table, which is easily updated to interface to newly developed or newly released license servers. The system runs as a separate process within the operating environment to monitor the application program, and as long as the application program continues to provide services to the user, the system sends periodic license renewal messages to the license server. The system also notifies the user when the application program cannot obtain a license in order to provide a consistent user interface across applications.

6 Claims, 9 Drawing Sheets

```
#NetLS LMTT

LICENSE_TYPE="NetLS"

NETLS_VENDOR_ID="4b282d7638881.02.0f.02.72.a9.00.00.00"

NETLS_PRODUCT_NAME="XDRAW"
NETLS_PRODUCT_ID=17
NETLS_PRODUCT_VERSION="1.0"
```

802

```
#Flexlm LMTT

LICENSE_TYPE="FLEXLM"

FLEXLM_VENDOR_ID="32768"

FLEXLM_PRODUCT_NAME="XDRAW"
FLEXLM_PRODUCT_ID=17
FLEXLM_PRODUCT_VERSION="1.0"
```

804

```
#SunNET LMTT

LICENSE_TYPE="SUNNET"

SUNNET_VENDOR_NAME="ACME_SOFTWARE"

SUNNET_PRODUCT_NAME="ACME_DRAW"
SUNNET_PRODUCT_ID=17
SUNNET_PRODUCT_VERSION="1.0"
```

METHOD FOR LICENSING SOFTWARE

This is a continuation of copending application Ser. No. 08/031,063 filed on Mar. 12, 1993, now abandoned.

FIELD OF THE INVENTION

This invention relates to Computer Systems and more particularly to licensing of software within a computer system. Even more particularly, the invention relates to licensing software through a common network licensing server.

BACKGROUND OF THE INVENTION

Licensing of computer software has traditionally been done by providing a copy of the software for each computer that was licensed to use the software. The licensed software was "locked" to the computer and could not be legally used on another computer. When computers are networked together, the practice of locking the software to a network node becomes particularly bothersome. One solution to this problem is to use a network license manager, also called a network license server. When a network license server is used, the software may be installed on any or all nodes of the network, however, only a certain number of licenses are purchased from the vendor. The license server limits the number of concurrent users of the software to the number of licenses purchased. This is done by providing some form of license "token" to the software when a user starts to use the software. That is, each time a user wants to use the software, the software sends a network message to the license server requesting a license token. If a token is available, it is returned to the software, and the software then performs its function for the user. When the user finishes using the software, the token is returned to the license server. When all the licenses are in use, the next user will not receive a token and must wait for one to become available. For example, if a network has ten nodes, the software may be installed on all the nodes. If only five licenses are purchased, five users may use the software at the same time. If a sixth user on the network attempts to use the software, no license is available, so this sixth user must wait. The software on this sixth node will not function until it receives a license token. In this manner, the software vendor gets paid for the maximum number of concurrent users, and the customer can start small and add licenses as the usage increases.

This method has proven popular and several different license servers are available from different software vendors. This causes a problem, however, since a customer may use any of the license servers available, and the application software vendor, who may be different from the license server software vendor, must provide different software to interface with each of the different license servers. To interface with the various license servers, an application software vendor must develop several different versions of the application software, one for each of the license servers. This is very costly, and causes considerable delay when the wrong version is sent to a user.

Another problem is that each of the license servers has different interface requirements. This increases development cost and increases the potential for errors. Still another problem is that a software application must be modified each time a new license server is developed or a new version of an existing server is released.

Providing a consistent user interface when a license is not available is yet another problem. When a license is not available, the user must be notified and given the choice of discontinuing the application or being placed in a queue to wait for a license. This user interface must be written for each license server used by each application, thus the user is presented with many different interfaces, all of which are used for solving the same problem.

There is need in the art for a common interface to allow application software to interface to various license servers. There is a further need in the art for such a common interface that allows application software to be easily adaptable to newly developed license servers. A still further need is for a common user interface to notify a user that a problem exists in obtaining a license. The present invention meets these and other needs.

SUMMARY OF THE INVENTION

It is an aspect of the present invention to provide a method of licensing a software application program via common network licensing server software.

It is another aspect of the invention to provide a common interface between such an application program and a plurality of network licensing servers.

Still another aspect is to allow such licensing with a single set of program calls from a single point in the application program.

A further aspect is to provide a single user interface for selecting available user options when a license to the software application is unavailable.

The above and other objects of the invention are accomplished in a system that provides a common application program interface to a variety of license servers. The system provides a single set of program calls and translates this single set of calls into a different set of calls for each license server. This translation is performed using a translation table, which is easily updated to interface to newly developed license servers or new versions of existing servers.

One of the requirement of most license servers is that the application program send a license renewal message to the license server periodically to notify the server that the license is still in use. If the application program fails to send the message, the license server times it out and releases the license to another user. The system of the present invention runs as a separate process within the operating system environment to monitor the application program, and as long as the application program continues to provide services to the user, the system of the present invention sends the periodic license renewal messages to the license server. This relieves the application program of the task of providing the periodic messages, thus the application program need only provide initialization calls, which considerably simplifies the application program.

The system also notifies the user when the application program cannot obtain a license. Since the system of the present invention is performing this notification, the user interface is consistent across all software applications that use the system of the present invention.

BRIEF DESCRIPTION OF THE DRAWINGS

The above and other aspects, features, and advantages of the invention will be better understood by reading the following more particular description of the invention, presented in conjunction with the following drawings, wherein:

FIG. 8 shows a diagram of the translation table used by the license monitor.

DESCRIPTION OF THE PREFERRED EMBODIMENT

The following description is of the best presently contemplated mode of carrying out the present invention. This description is not to be taken in a limiting sense but is made merely for the purpose of describing the general principles of the invention. The scope of the invention should be determined by referencing the appended claims.

Figure 1:
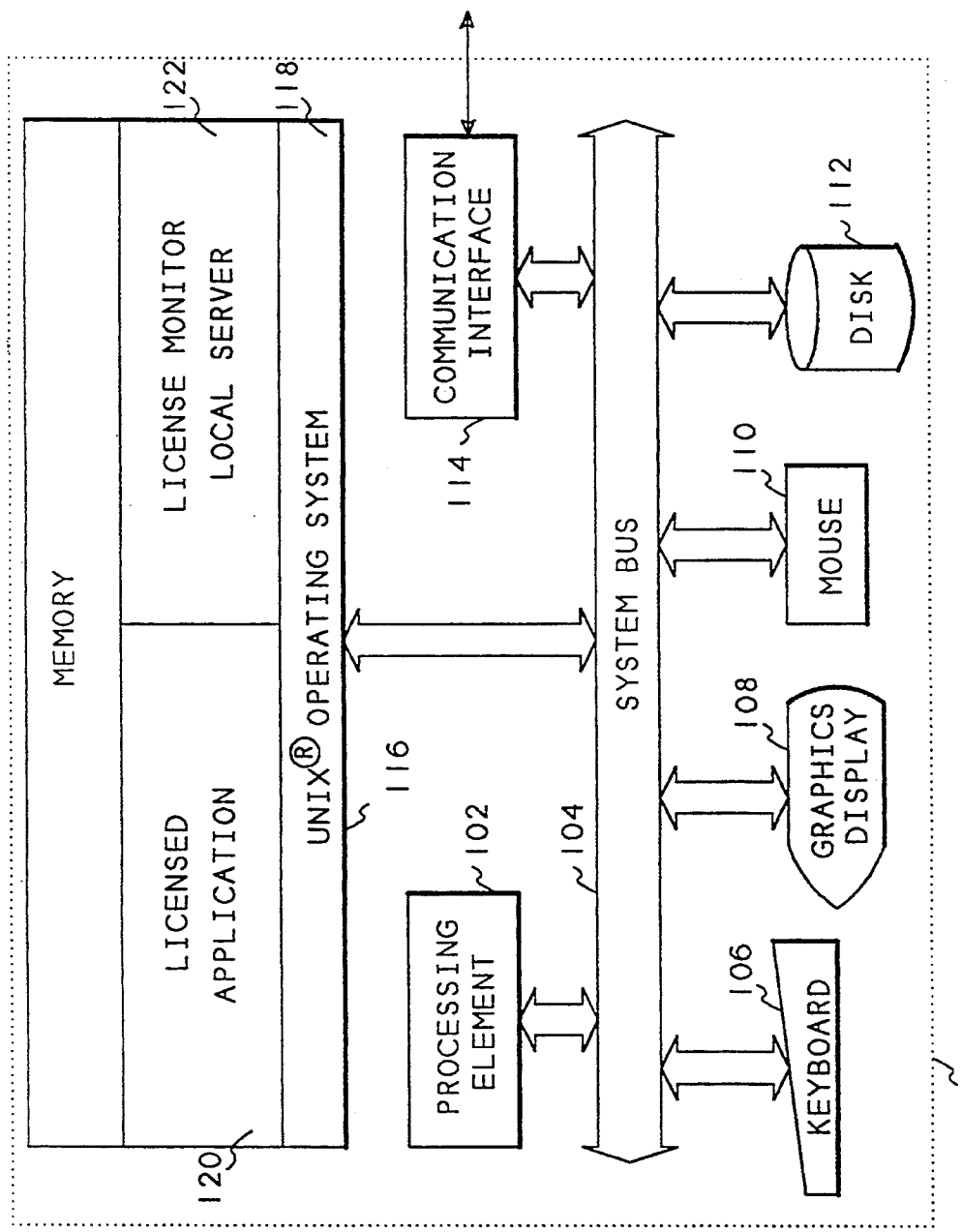
FIG. 1 shows a block diagram of a computer system incorporating the present invention.

FIG. 1 shows a block diagram of a computer system incorporating the present invention. Referring now to FIG. 1, a computer system 100 contains a processing element 102. The processing element 102 communicates to other elements of the computer system 100 over a system bus 104. A keyboard 106 allows a user of the system to input textual information, and a mouse 110 allows the user to input graphical information. A graphics display 108 allows the system to output text and graphics for viewing by the user. A disk 112 is used to store the software and data of the present invention, as well as software and data for the software application programs within the computer system 100. A communications interface 114 is used by the present invention to communicate with a license monitor remote server in another node of the network to which the computer system 100 is attached. Memory 116 contains the Unix multitasking operating system 118. Unix is a registered trademark of AT&T. In the preferred embodiment of the present invention, the invention uses the Unix operating system, however, other multitasking operating systems, or even a single tasking operating system such as MS DOS could be used with the present invention. A licensed application 120 uses the services of the present invention through library routines compiled and linked into the licensed application 120. These routines communicate to a license monitor local server task 122 which in turn communicates over the communications interface 114 to a vendor specific license server (not shown in FIG. 1).

Figure 2:
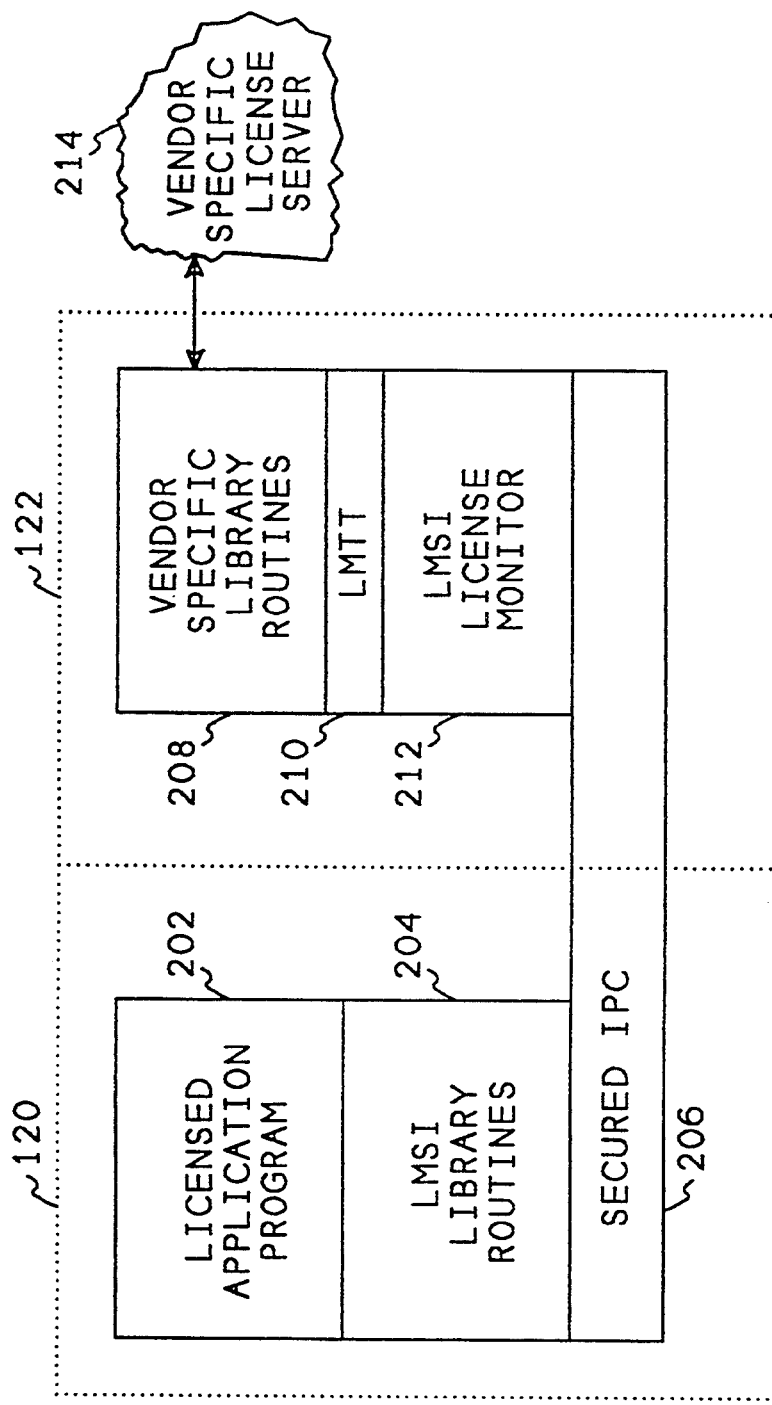
FIG. 2 shows a diagram of the processes of the present invention, and their way of communicating.

FIG. 2 shows a diagram of the processes of the present invention, and their interaction. Referring now to FIG. 2, the licensed application 120 from FIG. 1 is shown surrounded by dashed lines. Within the licensed application 120 is a licensed application program 202 which utilizes the services of the present invention. Linked into the licensed application 120 to communicate with the licensed application program 202 are a set of Licensed Mechanism Standard Interface (LMSI) library routines 204. These routines will be more fully described below. The LMSI library routines 204 communicate to the license monitor local server 122 over a secured interprocess communications link 206. The link 206 is made secure by encoding the data. Various means for encoding data are well known in the art. This encoding is necessary to prevent unauthorized usage of the licensed application program by supplying a bogus license monitor local server.

The license monitor local server 122 contains an LMSI license monitor 212 which receives communications from the LMSI library routines 204. The LMSI license monitor 212 uses a license monitor translation table (LMTT) 210 to translate the request from the licensed application program 202 into a set of requests for a particular set of vendor specific library routines 208. The vendor specific library routines 208 then communicate to a vendor specific license server 214, typically located in another node of the network. The vendor specific library routines 208 may be one of several different sets of routines for several different vendors, for example the NetLS license server, available from Hewlett Packard Company, the Flexlm license server available from Highland Software, and the SunNET license server available from Sun Microsystems, Inc.

Figure 3:
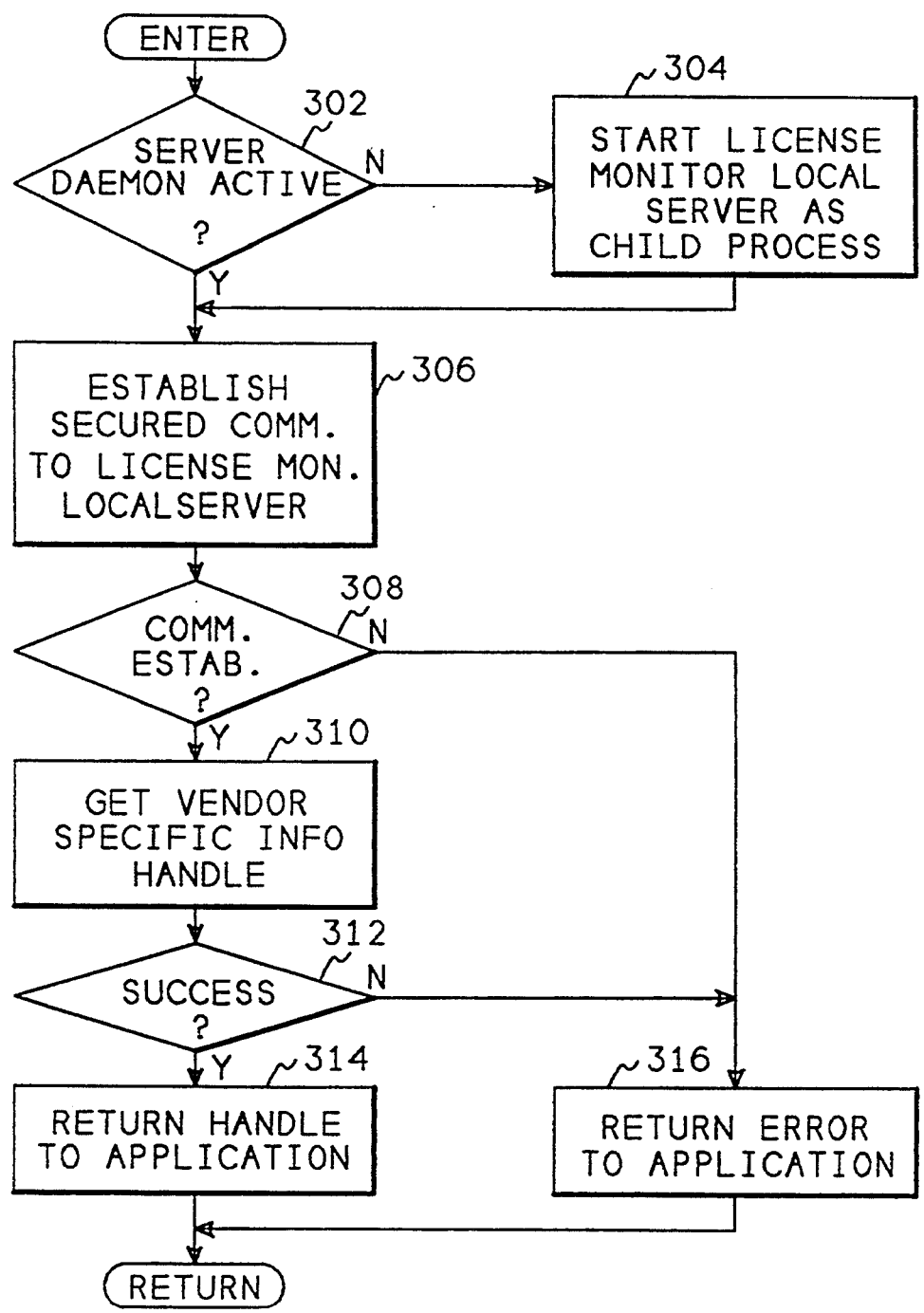
FIG. 3 shows a flowchart of the initialization process of the present invention.

FIG. 3 shows a flow chart of one of the LMSI library routines 204 (FIG. 2) called by the licensed application program 202 to initialize the license monitor. Referring now to FIG. 3, after entry, block 302 determines whether the license monitor local server 122 is currently running as a daemon. In the Unix operating system, a daemon is an independent process within the operating system, typically started during initialization of the operating system. This type of process performs various services for application programs. For example, printing is done by a daemon process in Unix. In the system of the present invention, the license monitor local server can be implemented as a daemon, or it can be implemented as a child process started by the process containing the licensed application. Block 302 determines whether a server daemon is active, and if one is not active, block 302 transfers to block 304 which starts the license monitor local server as a child process. After starting the child process, or if a daemon is already active, control transfers to block 306 which establishes secure communications to the license monitor local server. This secured communications is created by encoding all transfers between the license monitor local server and the LMSI library routines 204 within the licensed application 120. Block 308 then determines whether communications was established and, if not, block 308 transfers to block 316 which returns an error indication to the licensed application program 202. If secure communications has been established, block 308 transfers to block 310 which calls the LMSI license monitor 212 to get a vendor specific information handle from the LMTT 210. This "handle" is a pointer to information which is necessary for use by the application program 202 in all other calls to the LMSI library routines. Block 312 determines whether the handle was successfully obtained and, if not, transfers to block 316 to return an error. If the handle was successfully obtained, block 312 transfers to block 314 which returns the handle to the licensed application program 202.

Figure 4:
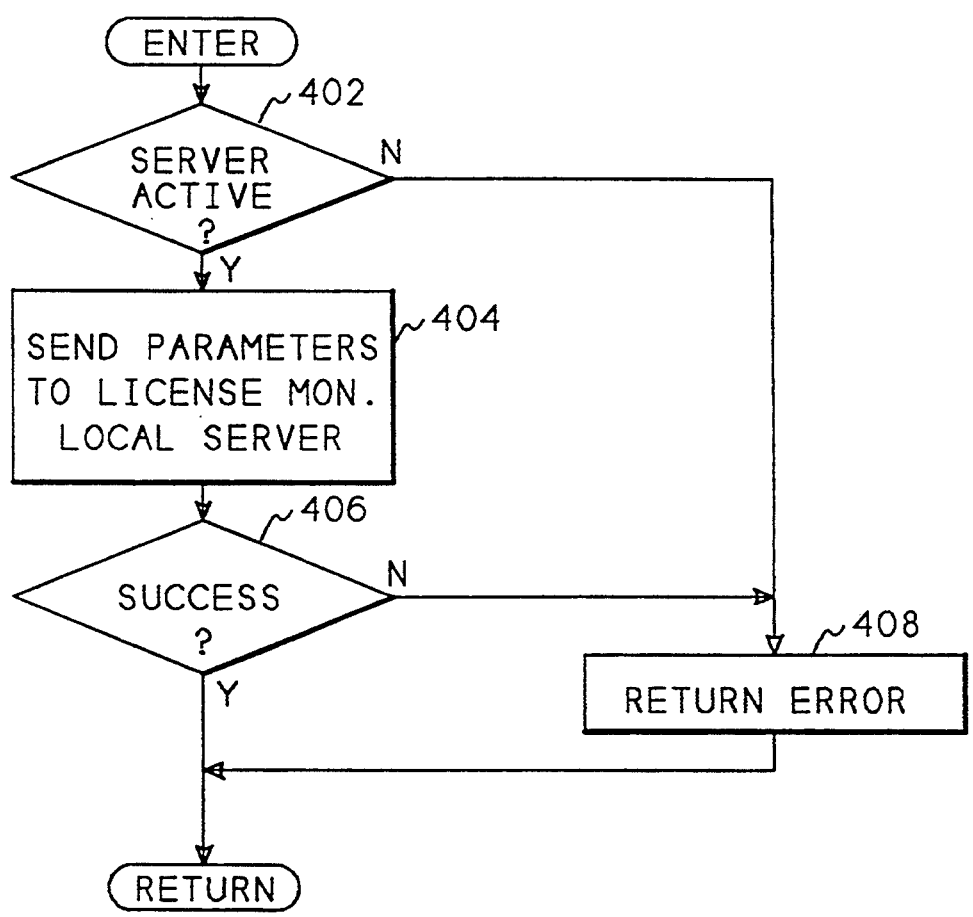
FIG. 4 shows a flowchart of the function called by the application software to interact with the license monitor after initialization.

FIG. 4 shows a flow chart of the routine called by the licensed application program 202 to interact with the license monitor local server after initialization. This routine is called to request a license, return a license, get a list of current users that are using licenses for the application, or, optionally, to check the current state of the license. Referring now to FIG. 4, after entry, block 402 determines whether the license monitor local server is active and, if not, block 402 transfers to block 408 to return an error condition. If the server is active, that is, the initialization routine of FIG. 3 was called prior to calling this routine, block 402 transfers to block 404 which sends the parameters necessary to perform the request for the application program 202 to the license monitor local server 122. Block 404 then waits until a message is returned from the license monitor local server and block 406 checks the status returned in this message. If the status indicates that the request was not performed successfully, block 406 transfers to block 408 which returns an error indication, otherwise, block 406 returns to the licensed application program 202 with a success indication, and it returns any data obtained by the request.

Figure 5:
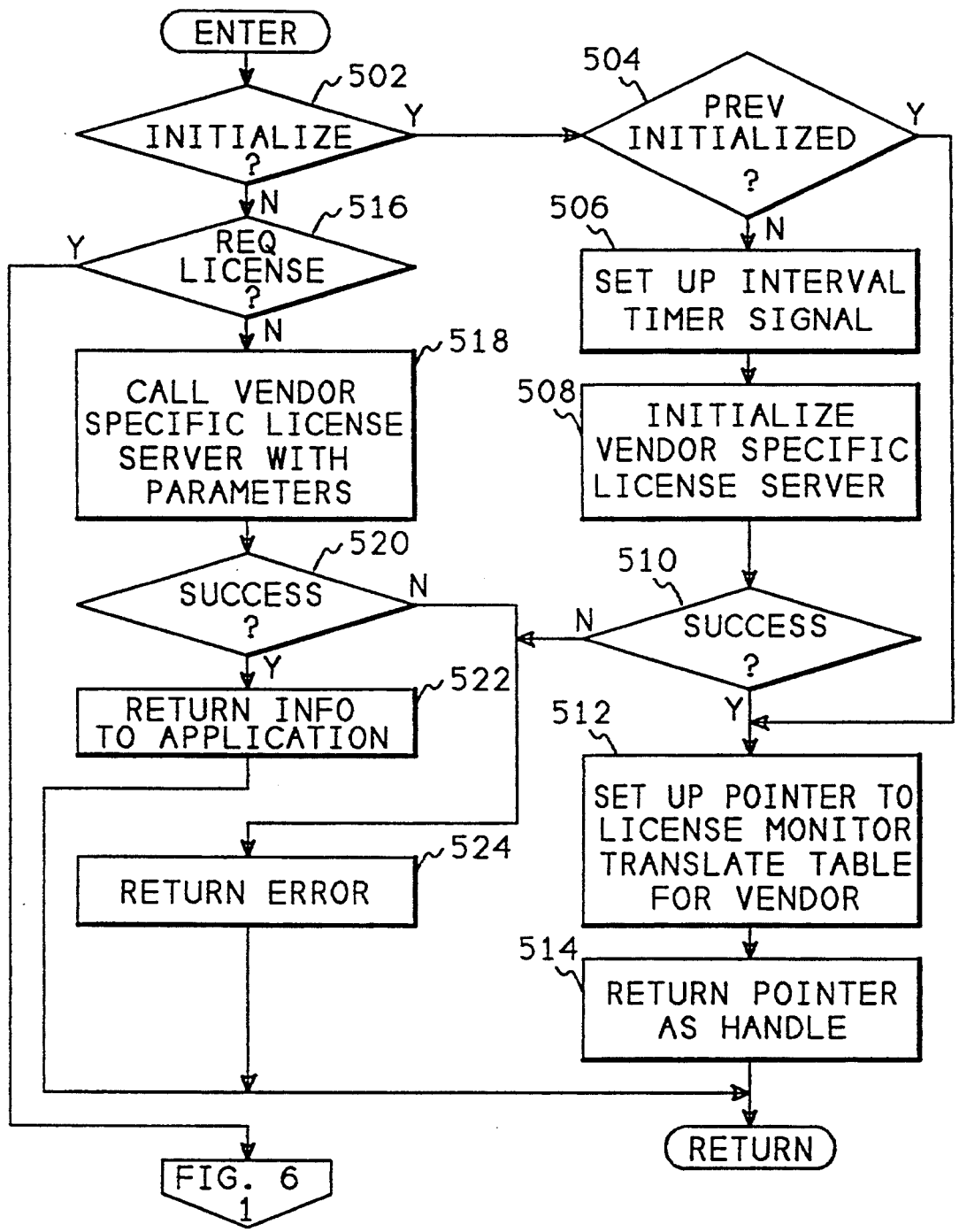
FIGS. 5, 6 and 7 show a flowchart of the license monitor of the present invention.
Figure 6:
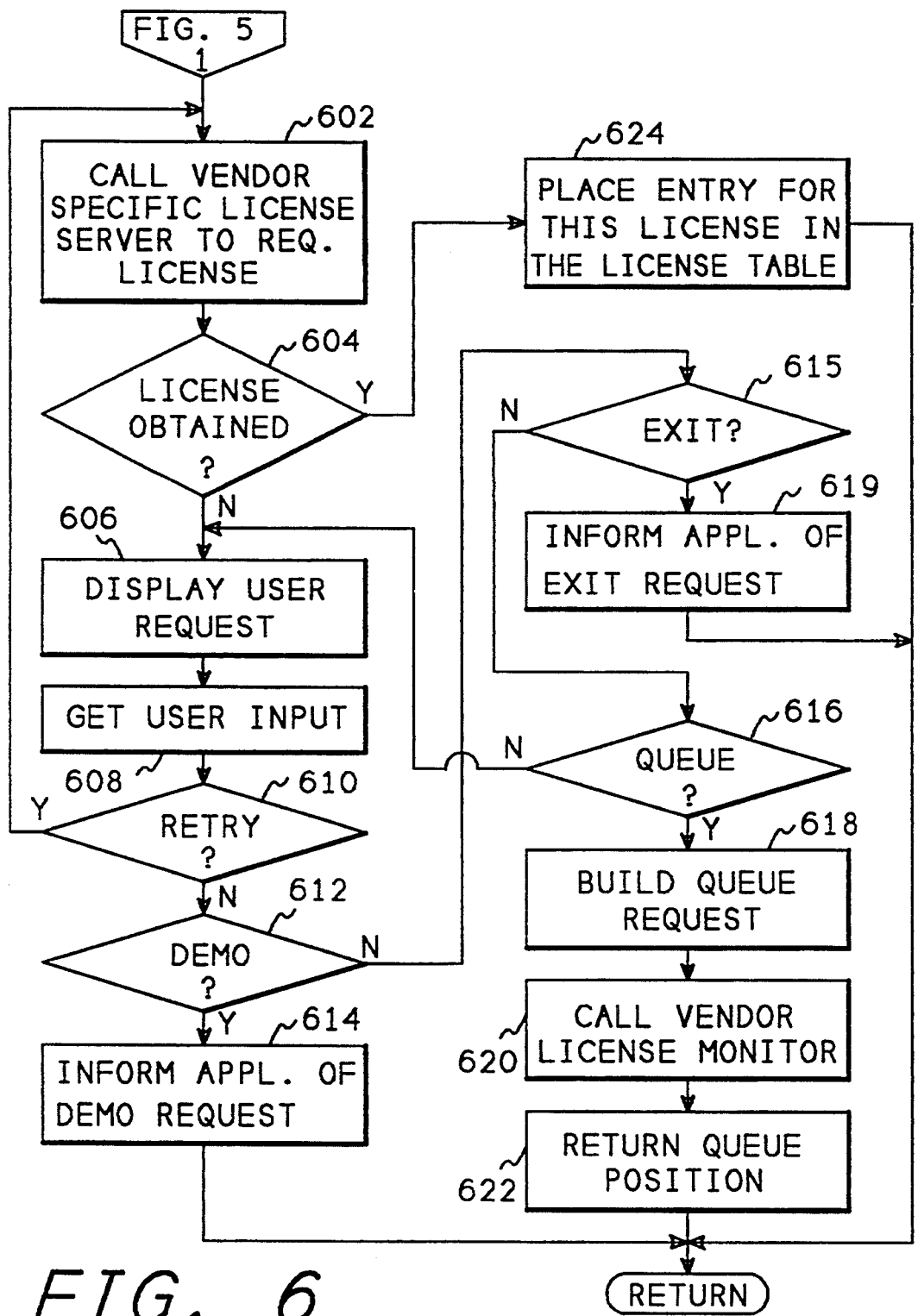
Figure 7:
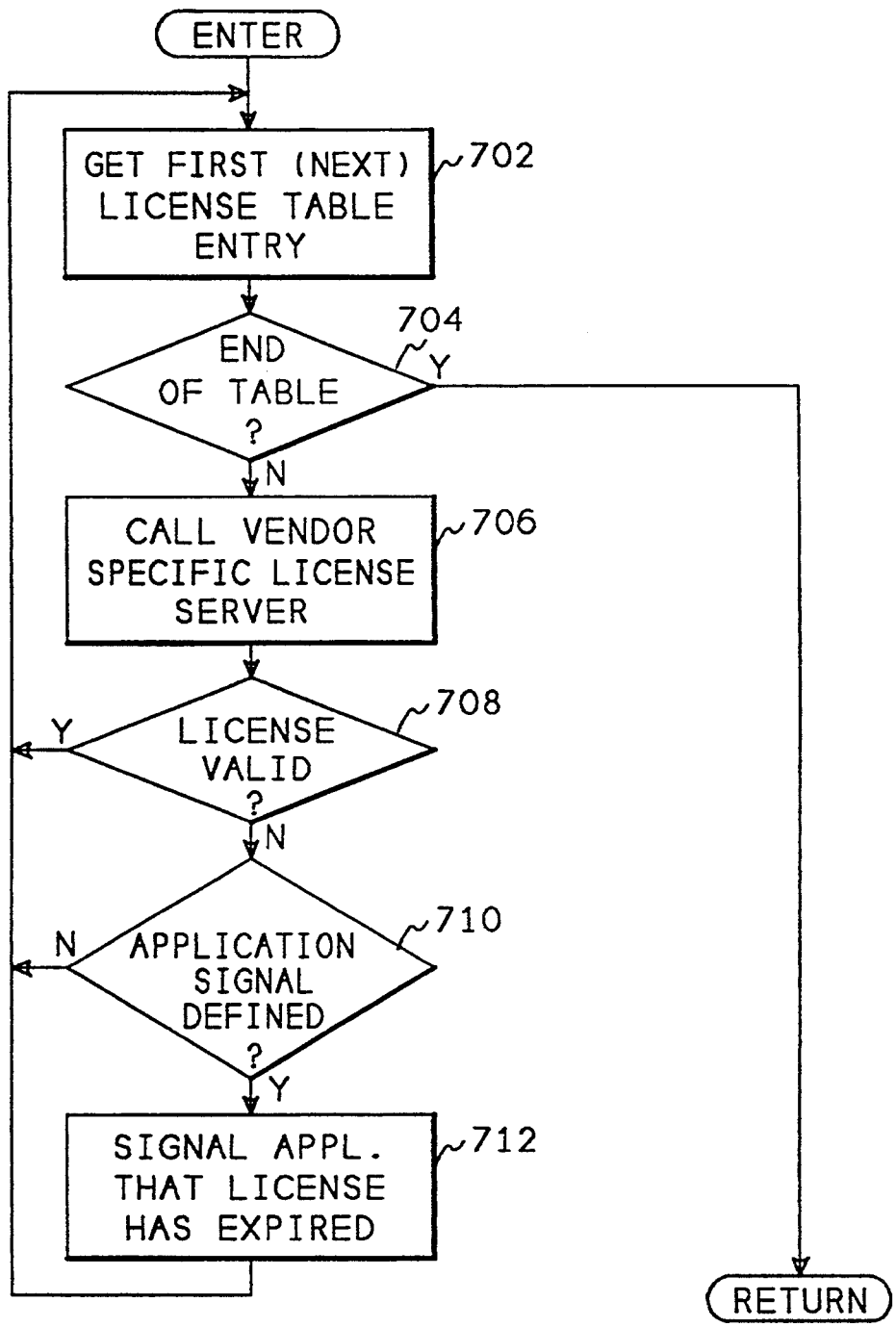

FIGS. 5, 6 and 7 show a flow chart of the LMSI license monitor 212 (FIG. 2). This monitor is sent messages by the routines of FIGS. 3 and 4 to cause it to perform the license monitor local server functions. Referring now to FIG. 5, after entry, block 502 determines whether the message sent from the LMSI library routines is for initialization. If the message is for initialization, block 502 transfers to block 504 which determines whether the license monitor local server has been previously initialized. If not, block 504 transfers to block 506 which sets up an interval timer signal to cause the operating system to periodically call FIG. 7. This call is used to send periodic license renewal requests to the license monitor remote server, located in another node of the network, to keep the license available to the licensed application program. If these periodic calls are not made, the vendor specific license server may assume that the node containing the licensed application program is no longer functional and may free the license for use by others. After setting up the interval timer signal, block 506 transfers to block 508 which calls the vendor specific library routines 208 (FIG. 2) to perform the initialization. Each of the various sets of vendor specific library routines that interface with the present invention has some form of initialization. Block 508 calls the vendor specific library routines using the specific form acceptable to the specific vendor. After the initialization, block 510 determines whether the initialization was successful and, if not, transfers to block 524 which returns an error indication. If the initialization was successful, or if the license monitor local server had been previously initialized, control transfers to block 512 which sets up a pointer to an area within the license monitor translation table 210 (FIG. 2) for this particular vendor. Block 514 then returns this pointer as the handle to the LMSI library routine 204. If the message is not for initialization, block 502 transfers to block 516 which determines whether the call is to request a license. If the call is not for a license request, that is, the call is for returning a license, or for getting the number of current users that are using licenses for an application, or it is a call for checking the state of the current license, control transfers to block 518 which calls the vendor specific library routines 208 (FIG. 2) and passes the parameters to obtain the information requested by the LMSI library routines 204. Block 520 then determines whether the call was successful and, if not, block 520 transfers to block 524 which returns an error message to the LMSI library routines 204. If the call was successful, block 520 transfers to block 522 which returns the information requested by the application.

If the message sent by the LMSI library routines 204 is to request a license, block 516 transfers to FIG. 6 block 602. Block 602 calls the vendor specific library routines 208 to request a license and waits for the vendor specific library routines to contact the vendor specific license server to obtain the license token. After the call returns, block 604 determines whether the license was obtained. If the license was obtained, block 604 transfers to block 624 which places an entry for this license in a license table, which will be used by FIG. 7 for the periodic license renewal calls. Block 624 then returns a success indication to the LMSI library routines 204.

Figure 9:
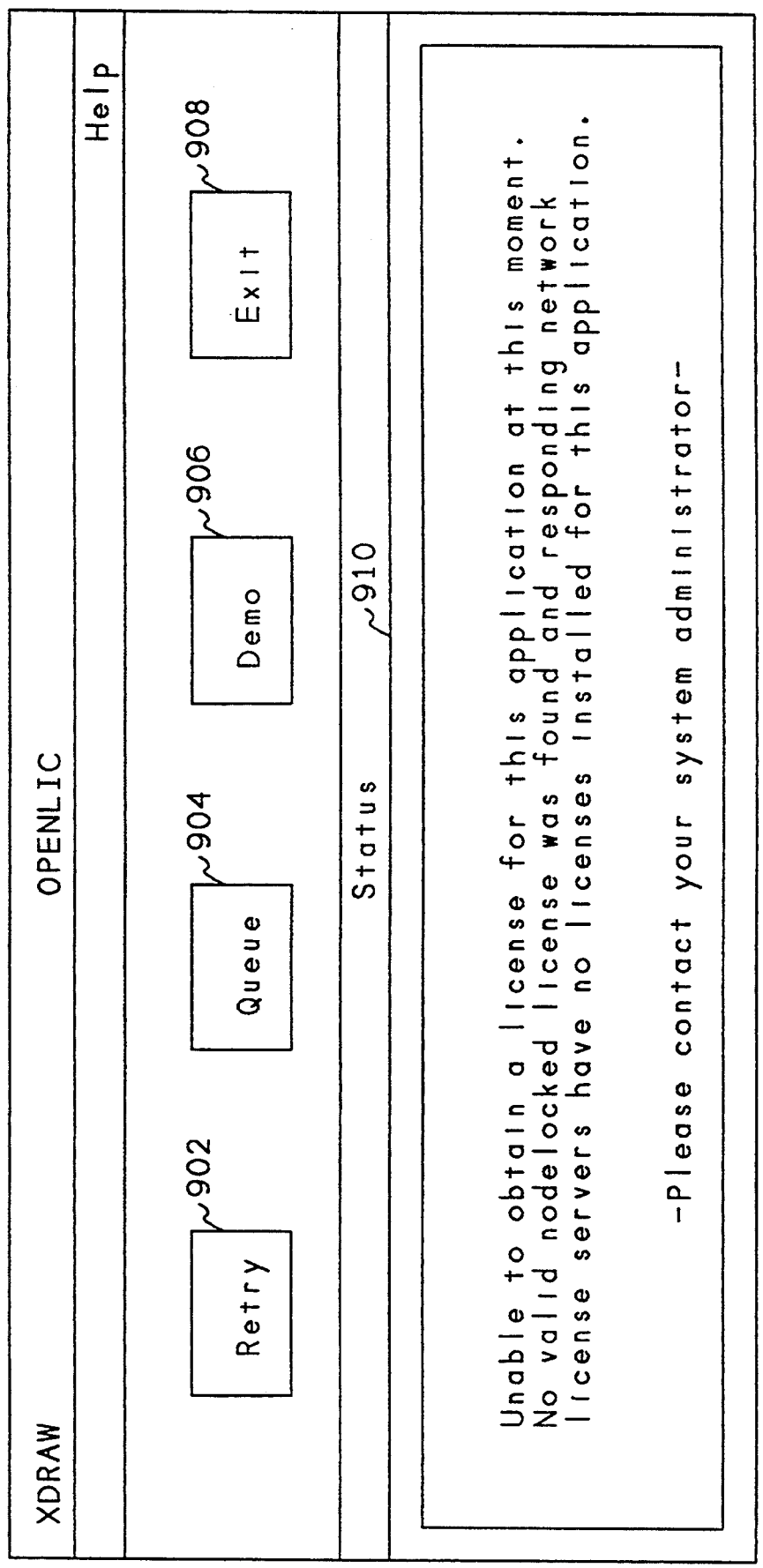
FIG. 9 shows the user interface screen that displays user options when a license is unavailable.

If the license was not obtained, block 604 transfers to block 606 which displays a user request asking the user for input. An example display of this user request is shown in FIG. 9. The display shown in FIG. 9, is a typical display from a windowing system, and provides several "buttons" that the user can use to indicate their choice. The application program may disable any of these buttons when it calls the LMSI library routines 204. This allows the application to have complete control over the system. Button 902 allows the user to request a retry, button 904 allows a user to request placing the request in a queue, button 906 allows the user to request a demonstration copy of the software, and button 908 is used when the user wishes to discontinue trying to obtain a license. Status box 910 will be used by block 606 to display a message indicating the current conditions. The example message given in box 910 would occur when the licensed application program was unknown to the vendor specific license server.

If the system is not being used with a windowing system, a character based user interface is used. This interface (not shown) is similar to the display of FIG. 9, but uses the arrow keys and the enter key instead of a mouse.

After displaying the user request block 606 transfers to block 608 to get the user input. Block 610 then determines whether the user has clicked the mouse on the retry button 902 and, if so, block 610 transfers back to block 602 for another attempt at obtaining a license. If the user input is not for a retry, block 610 transfers to block 612 which determines whether the user clicked the mouse on the demo button. If the user clicked the mouse on the demo button, block 612 transfers to block 614 which informs the application that a demonstration has been requested and then returns. If the user did not click the demo button, block 612 transfers to block 615 which determines whether the user clicked the exit button 908, If the user did click on the exit button 908, block 615 transfers to block 619 which informs the application that exit has been requested and returns. If the user did not click on the exit button 908, block 615 transfers to block 616 which determines whether the user clicked on the queue button 904. If the user did not click on the queue button 904, block 616 transfers back to block 606 to re-display the user request. If the user did click on the queue button, block 616 transfers to block 618 which builds a queue request and then block 620 calls the vendor specific library routines 208 to send the queue request to the vendor specific license server to place this licensed application program into a queue to obtain the next license available. Block 622 then returns the queue position to the LMSI library routines 204.

FIG. 7 shows a flow chart for a timer signal handler routine. A call to this signal handler was set up by block 506 (FIG. 5). As discussed above, this routine is used to send periodic license renewal requests to the vendor specific license server to keep the license active. Referring now to FIG. 7, after entry, block 702 gets the first or next license table entry. This table was set up by block 624 (FIG. 6). Block 704 determines whether the end of the table has been reached and if it has, block 704 returns from the timer interrupt. If one or more entries is still available in the license table, block 704 transfers to block 706 which calls the vendor specific library routines 208 to have it send a message over the network to the vendor specific license server to keep the license active. If the license is still active, the vendor specific license server will return a message to the vendor specific library routines 208 which will return the status to block 706. After receiving the status, block 708 determines whether the license is valid and if it is, transfers control back to block 702 to check the next entry in the license table. If the license is not valid, block 708 transfers to block 710 which determines whether the application had set up a signal to be called when an invalid license is detected. A license may expire because the expiration date for the license has passed or the license server can no longer be contacted (possibly caused by a network failure). If the license server cannot be contacted, the server may eventually re-issue the license to another application running on a different node. Also, some applications cannot deal with signals, therefore, the application can disable the signal feature when it calls the LMSI library routines 204. Instead, the application may request the current state of the license from the system, as described above with respect to FIG. 4 and the call to check the current state of the license.

If no signal had been set up, block 710 returns to block 702 to check the next table entry. If a signal had been set up, block 710 transfers to block 712 which signals the licensed application program 202 that the license has expired. Block 712 then returns to block 702 to check the next entry.

FIG. 8 shows an example of the license monitor translation table 210 (FIG. 2). Referring now to FIG. 8, block 802 shows an example of the translation table entries for the NetLS vendor specific library routines. Block 804 shows the translation table entries for the Flexlm vendor specific library routines, and block 806 shows the translation table entries for the SunNET vendor specific library routines. As shown in each of the blocks, the entries are position dependent, which allows the information supplied by the licensed application program to be easily translated into the information needed by, the vendor specific library routines. Those skilled in the art will recognize that many other methods could be used to set up the translation table.

Having thus described a presently preferred embodiment of the present invention, it will now be appreciated that the aspects of the invention have been fully achieved, and it will be understood by those skilled in the art that many changes in construction and circuitry and widely differing embodiments and applications of the invention will suggest themselves without departing from the spirit and scope of the present invention. The disclosures and the description herein are intended to be illustrative and are not in any sense limiting of the invention, more preferably defined in scope by the following claims.

What is claimed is:

1. A computer implemented method for interfacing between a licensed application program and a plurality of license server programs in an operating system executing in a computer system, for the purpose of obtaining a license to use the licensed application program, said computer implemented method comprising the steps of:

(a) programmatically receiving a license request from the licensed application program, wherein said license request is defined in a first format;

(b) programmatically requesting identification information from a currently active license server program to identify which one of the plurality of license server programs is currently in use by the operating system;

(c) programmatically translating said license request from said first format into a second format required by said one of the plurality of license server programs identified in step (b);

(d) programmatically sending said translated request to said license server program identified in step (b);

(e) programmatically receiving a response from said license server program identified in step (b), wherein said response indicates whether a license to use the licensed application program is granted; wherein step (e) further comprises the steps of:

(e1) when said response indicates said license is not granted, presenting an options menu to a user of the licensed application program, through a display attached to said computer system;

(e2) obtaining a menu selection input from the user through an input device attached to said computer system;

(e3) immediately retrying said license request by repeating steps (d) and (e), when said menu selection input from the user requests that said license request be attempted again; and (e4) sending a queue request to said license server program currently in use, to place said license request into a queue, when said menu selection input from the user requests waiting for a license to be granted, whereby said license server program currently in use may grant a license when a license becomes available;

(f) programmatically sending said response to the licensed application program, whereby said licensed application program continues execution when said license is granted and discontinues when said license is not granted; and (g) programmatically initiating and sending, at predefined periodic intervals, a license renewal request to said one of the plurality of license server programs identified in step (b), said license renewal request being initiated and sent independently of receiving a license renewal request from the licensed application program.

2. A system for interfacing between a licensed application program and a plurality of license server programs, said system comprising:

a computer system;

a multi-tasking operating system contained within a memory of said computer system;

means for performing the licensed application program within one task of said multi-tasking operating system;

library module program means, programmatically linked to the licensed application program, for receiving a license request from the licensed application program;

license monitor means, located in a separate task of said multi-tasking operating system, for communicating with said plurality of license server programs;

means within said license monitor means for determining which one of the plurality of license server programs is currently in use by said multi-tasking operating system;

communication means, connected between said library module program means and said license monitor means, for sending said license request from said library module program means to said license monitor means and for receiving a response from said license monitor means;

translation means, contained within said license monitor means, for translating said license request into a translated request having a request format defined by said one of the plurality of license servers currently in use;

means for sending said translated request from said license monitor means to said one of the plurality of license server programs currently in use;

response means for using said communication means for sending a response received from said one of the plurality of license server programs currently in use to said library module means and for further sending said response to the licensed application program wherein said response indicates whether a license to use said licensed application program is granted;

means within said license monitor means for determining that the licensed application program is continuing to be performed within the multi-tasking operating system;

means within said license monitor means for initiating and sending, at predefined periodic intervals, a license renewal request to said one of the plurality of license server programs currently in use, said license renewal request being sent only when the licensed application program is continuing to be performed within the multi-tasking operating system, and said license renewal request being sent independently of receiving a license renewal request from the licensed application program.

3. The system of claim 2 wherein said library module program means further comprises:

means for determining whether said license monitor means is currently operating in separate task of said multi-tasking operating system, said means for determining being operable prior to sending said license request through said communications means; and means for activating said license monitor as a separate task when said means for determining determines that license monitor is not currently operating.

4. The system of claim 2 wherein said response means further comprises:

means for presenting an options menu to a user of the licensed application program, through a display attached to said computer, when said one of the plurality of license server programs currently in use fails to grant a license;

input means, attached to said computer, for obtaining menu selection input from the user;

means for immediately re-sending said license request to said one of said plurality of license server programs currently in use when said input from the user requests that said license request be attempted again;

means for sending a queue request to said license server program currently in use to place said license request into a queue when said input from the user requests waiting for a license to become available, whereby said one of said plurality of license server programs currently in use may grant a license when a license becomes available; and means for immediately sending a request to said license server program currently in use for a second type of license when said input from the user requests said second type of license.

5. The system of claim 2 further comprising encoding means within said communication means for securing all information sent over said communication means.

6. A computer implemented method for interfacing between a licensed application program and a plurality of license server programs in an operating system executing in a computer system, for the purpose of obtaining a license to use the licensed application program, said computer implemented method comprising the steps of:

(a) programmatically receiving an unrestricted type license request from the licensed application program, wherein said license request is defined in a first format;

(b) programmatically requesting identification information from a currently active license server program to identify which one of the plurality of license server programs is currently in use by the operating system;

(c) programmatically translating said license request from said first format into a second format required by said one of the plurality of license server programs identified in step (b);

(d) programmatically sending said translated request to said license server program identified in step (b);

(e) programmatically receiving a response from said license server program identified in step (b), wherein said response indicates whether an unrestricted type license to use the licensed application program is granted, and when said unrestricted type license is not granted, performing the steps of (e1) presenting an options menu to a user of the licensed application program, through a display attached to said computer system, (e2) obtaining a menu selection input from the user through an input device attached to said computer system, (e3) when said menu selection input from the user requests that said license request be attempted again, immediately retrying said license request by repeating steps (d) and (e), (e4) when said menu selection input from the user requests waiting for a license to be granted, sending a queue request to said license server program currently in use, to place said license request into a queue, whereby said license server program currently in use may grant a license when a license becomes available, and (e5) when said input from the user requests a second type of license, sending a request for said second type of license;

(f) programmatically sending said response to the licensed application program, whereby said licensed application program continues execution when said license is granted and discontinues execution when said license is not granted; and (g) programmatically initiating and sending, at predefined periodic intervals, a license renewal request to said one of the plurality of license server programs identified in step (b), said license renewal request being initiated and sent independently of receiving a license renewal request from the licensed application program.

* * * * *